April 22, 1924.

F. W. SLACK

SPARE TIRE CARRIER

Filed Nov. 27, 1922  2 Sheets-Sheet 1

1,491,175

Inventor
Frederick W. Slack,
by
Thurston Kwis & Hudson
attys

April 22, 1924.
F. W. SLACK
SPARE TIRE CARRIER
Filed Nov. 27, 1922
1,491,175
2 Sheets-Sheet 2
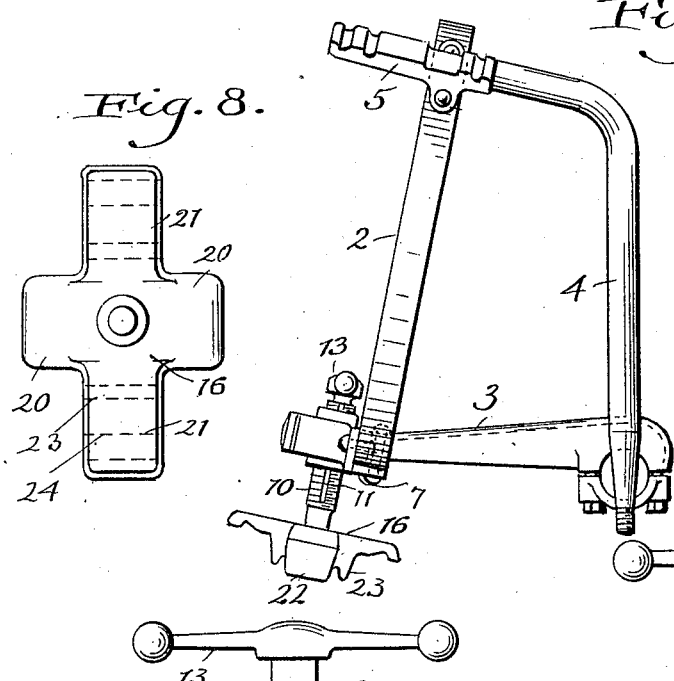
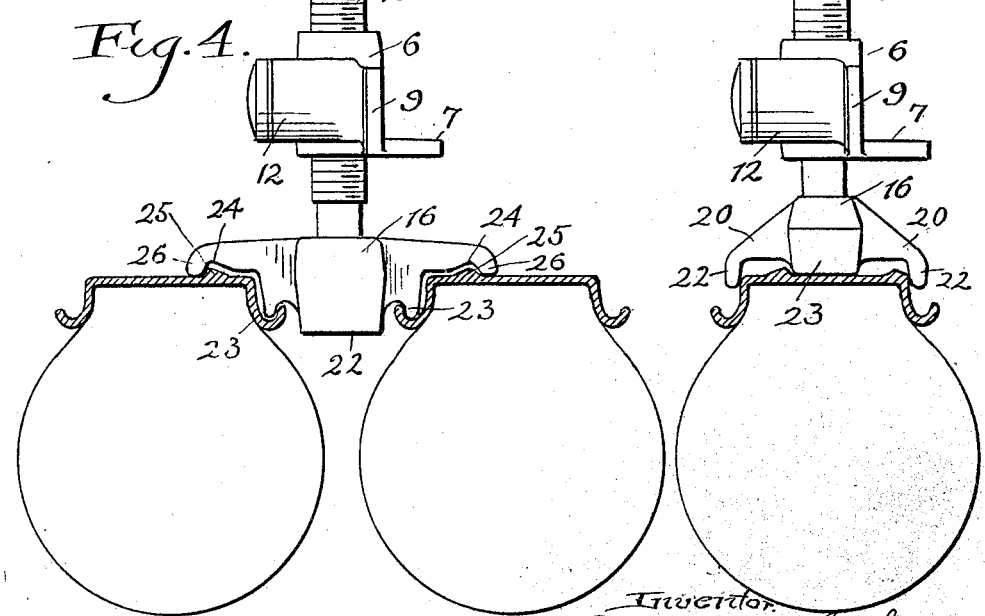
Inventor
Frederick W. Slack
by Thurston Kwis + Hudson
attys Patented Apr. 22, 1924.

1,491,175

UNITED STATES PATENT OFFICE.

FREDERICK W. SLACK, OF CLEVELAND, OHIO.

SPARE-TIRE CARRIER.

Application filed November 27, 1922. Serial No. 603,481.

*To all whom it may concern:*

Be it known that I, FREDERICK W. SLACK, a citizen of the United States, residing at Cleveland, in the county of Cuyahoga and State of Ohio, have invented a certain new and useful Improvement in Spare-Tire Carriers, of which the following is a full, clear, and exact description.

This invention relates to spare tire carriers designed to support one or more assembled tires and rims upon an automobile body, and more particularly to a carrier of the type in which the rim or rims are held upon the tire carrier by means of fixed and radially adjustable supporting members engaging the inner portions of the rim or rims.

An object of the invention is to provide a tire carrier in which a member may be used by a simple adjustment for clamping a single rim or plurality of rims.

A further object is to provide a rim engaging member provided with differently formed rim receiving parts and adjustable to bring the desired rim receiving part into proper position for holding a single rim or a plurality of rims.

With the above and other objects of the invention in view, my invention consists in the improved tire carrier illustrated in the accompanying drawings and hereinafter described and particularly claimed, and in such variations and modifications thereof as will be obvious to those skilled in the art to which my invention relates.

Figure 1:
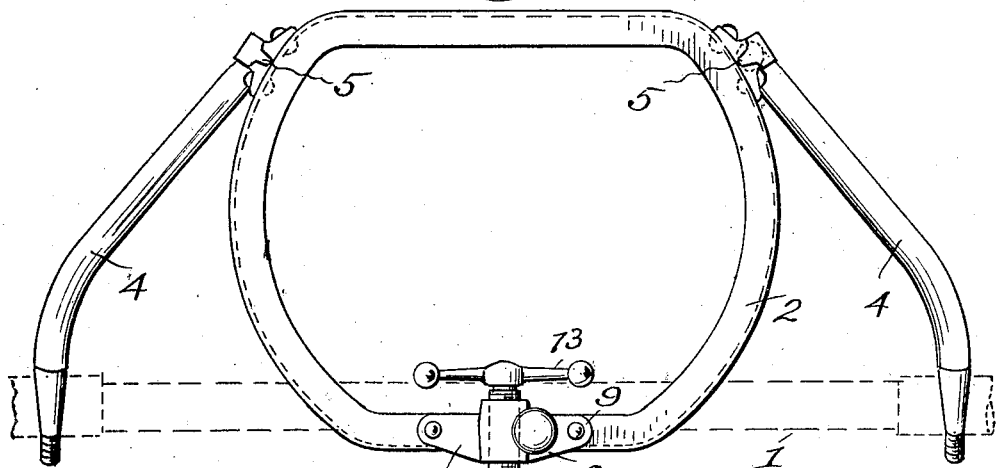
Figure 2:
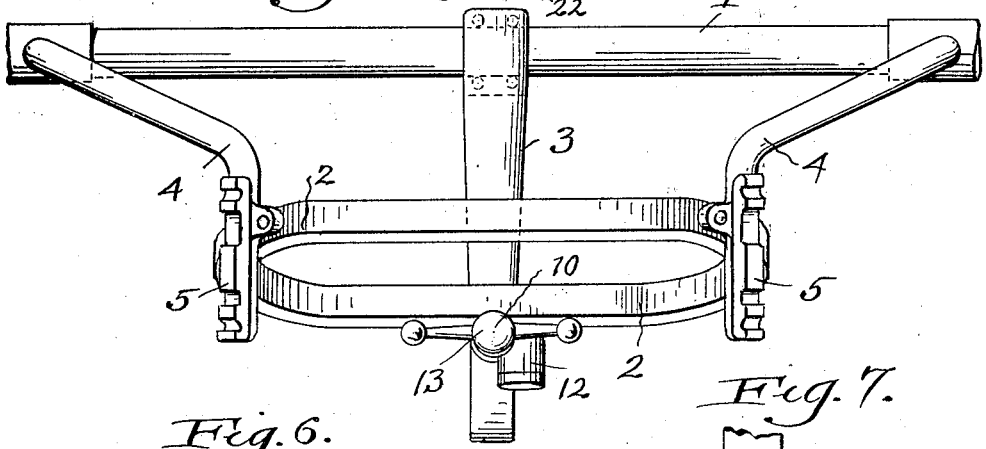
Figure 6:
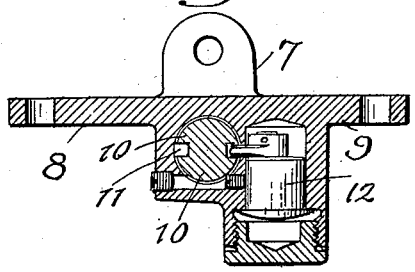
Figure 7:
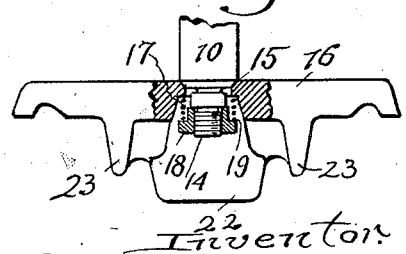

Reference should be had to the accompanying drawings forming a part of this specification in which Fig. 1 is a rear elevation of the improved tire carrier; Fig. 2 is a top plan view of the carrier; Fig. 3 is a side elevation of the carrier; Fig. 4 is a sectional view showing the position of the adjustable rim engaging member when clamping two rims side by side; Fig. 5 is a view similar to Fig. 4 showing the position of the rim engaging member when clamping a single rim; Fig. 6 is a horizontal section through the supporting bracket for the adjusting screw; Fig. 7 is a side elevation of the adjustable rim engaging member, a part thereof being broken away to show the connection between the rim engaging member and adjusting screw; Fig. 8 is a top plan view of the adjustable rim engaging member.

Referring to the accompanying drawings, the tire carrier is shown rigidly secured to a cross bar 1 at the rear end of the automobile frame and consists of a ring 2 formed of angle iron and flattened at the top and bottom; the ring 2 being rigidly supported from the cross bar 1 by means of a rearwardly extending arm 3 fixed to the central portion of the cross bar 1 at its front end and rigidly secured to the flat lower portion of the ring 2 at its rear end, and by upwardly and rearwardly extending arms 4 which are rigidly secured to the bar 1 adjacent the ends thereof and are secured to upper portions of the ring 2 at their rear ends. The arms 4 are attached to the ring 1 adjacent the opposite ends of the flat top portion thereof and have rim engaging parts 5 at their outer ends which are suitably formed to retain either one or two tire carrying rims, the portions 5 as shown herein being provided with transverse grooves adapted to receive circumferential inner ribs of demountable rims. Secured to the lower flat portion of the ring 2 is a bracket 6 which has an inwardly extending flange 7 adapted to be secured to the inwardly extending flange of the ring 2 and laterally extending flanges 8 and 9 adapted to be secured to the outer face of the ring 2. The bracket 6 has a vertical screw threaded opening therethrough adapted to receive the adjusting screw 10 which carries the radially adjustable rim clamping member. The screw 10 has longitudinally extending grooves or key-ways 11 which are adapted to be engaged by a suitable locking device 12 to lock the screw in clamping position and is provided at its upper end with an operating handle 13. The lower end of the adjusting screw 10 has a reduced portion 14 and an inclined bearing shoulder 15 by means of which the rim engaging member 16 is pivotally connected to the adjusting screw. The member 16 has a central recess 17 on its underside and an opening through the bottom of the recess 17 to receive the reduced end 14 of the screw 10, the upper portion of the opening being flared to conform to the shoulder 15 of the screw. The member 16 is held in place by means of a nut 18 upon the threaded reduced end 14 of the screw and a coil spring 19 which is interposed between the nut 18 and the bottom of the recess 17, the nut 18 and spring 19 being within the recess 17.

As shown in Fig. 8 the rim engaging member 16 has diametrically opposed short arms 20 and similarly arranged long arms 21 at right angles to the arms 20. The short arms 20 have downwardly extending flanges 22 at the ends thereof adapted to engage upon opposite sides of a rim. The long arms 21 have inner flanges adjacent the arms 20 which project downwardly but terminate short of the ends of the flanges 22. The outer portions of the arms 21 are offset upwardly from the inner portions thereof and are provided with a groove 24 adapted to receive the circumferential rib 25 of a demountable rim and end flanges 26 which are adapted to engage the inner surfaces of the rims outside the ribs 25. By reason of the pivotal connection between the adjusting screw 10 and the rim engaging member 16, the member 16 can be turned either to a position as shown in Fig. 4 for engaging a pair of rims or to the position shown in Fig. 5 for engaging a single rim. When the member 16 engages a pair of rims as shown in Fig. 4, the short arms 20 thereof lie between the two rims. When the member 16 is adjusted to engage a single rim, long arms 21 lie within the rim and the flanges 23, engage the inner surface of the rim as shown in Fig. 5. When a single rim is engaged, the center portion of the rim is in line with the adjusting screw 10 so that the thrust of the screw is directly upon the rim and when a pair of rims are engaged as shown in Fig. 4 the axis of the screw is midway between the two rims and the thrust upon the screw is balanced.

Having described my invention, I claim:

1. In a spare tire carrier, the combination with a fixed rim engaging member adapted to engage and hold against lateral movement one or a plurality of rims, of a radially adjustable tire engaging member adapted to engage a portion of the rims opposite that engaged by the fixed member, said radially adjustable tire engaging member having transverse angularly disposed rim engaging portions, one of said portions being adapted to engage a single rim and another of said portions being adapted to engage a plurality of rims, said member being angularly movable to bring the desired rim engaging portion into operative position.

2. In a spare tire carrier, the combination with a pair of fixed rim engaging members spaced apart and engageable with the inner side of a rim, said members having a plurality of laterally spaced depressions adapted to receive rim parts, a radially disposed longitudinally adjustable member having a head angularly movable thereon, said head having angularly disposed arms with differently formed rim engaging faces, said head being angularly adjustable to bring the desired arm into rim engaging position.

3. In a spare tire carrier, the combination with a pair of upper fixed rim engaging members spaced apart and adapted to receive two rims side by side or a single rim, said members having projections for holding said rims against lateral movement, of a radially disposed longitudinally adjustable member having a rim engaging head mounted to turn thereon, said head having an outer transverse portion adapted to receive and hold a single rim, and arms spaced inwardly from said outer portion and at right angles thereto each of said arms being adapted to engage and hold a rim.

4. In a spare tire carrier, a rim engaging member having a part adapted to be positioned transversely with respect to a rim and engageable with the rim to hold the same against lateral movement, parts on opposite sides of said first mentioned part and extending at right angles thereto, each adapted to engage and retain a rim, said member being adjustable angularly so that it may be positioned to receive a single rim or a pair of rims side by side.

5. In a spare tire carrier, rim engaging members having angularly disposed rim engaging parts, one of said parts being formed to receive a single rim, the other of said parts being formed to receive a plurality of rims, said member being angularly adjustable to bring either the single rim engaging part into operative position or the plural rim engaging part into operative position.

6. In a spare tire carrier, a rim engaging member having angularly disposed differently formed rim receiving parts, said member being angularly adjustable to bring the desired rim receiving part into operative position.

7. In a spare tire carrier, a rim engaging member having a rim receiving part provided with end flanges adapted to engage opposite sides of a rim, arms projecting laterally at right angles from the central portion of said single rim engaging part, said arms each being formed to receive a rim, said member being pivoted to turn laterally about a central axis whereby the member may be positioned to receive a single rim or a pair of rims.

In testimony whereof, I hereunto affix my signature.

FREDERICK W. SLACK.